United States Patent [19]

Blasberg et al.

[11] Patent Number: 4,753,379
[45] Date of Patent: Jun. 28, 1988

[54] METHOD AND APPARATUS FOR REGULATING THE LENGTH OF WORKPIECES

[75] Inventors: Bernd Blasberg, Burscheid; Werner Engel, Leverkusen, both of Fed. Rep. of Germany

[73] Assignee: Goetze AG, Burscheid, Fed. Rep. of Germany

[21] Appl. No.: 690,818

[22] Filed: Jan. 11, 1985

Related U.S. Application Data

[63] Continuation of Ser. No. 515,971, Jul. 21, 1983, abandoned.

[30] Foreign Application Priority Data

Jul. 23, 1982 [DE] Fed. Rep. of Germany ....... 3227556

[51] Int. Cl.⁴ ................. B65H 20/20; B21F 35/04; C21D 1/18; C21D 9/52
[52] U.S. Cl. ........................... 226/24; 72/378; 140/89; 148/128; 148/130; 148/156; 226/178
[58] Field of Search ............... 148/128, 130, 156, 131, 148/150, 153, 152, 155, 151; 72/12, 137, 15, 286, 33, 34, 205, 378, 301, 302, 128, 342, 183; 242/57; 226/111, 30, 10, 123, 108, 195, 118, 117, 152, 32, 141, 24; 318/7; 29/173, 33 F, 34 D, 402.21, DIG. 21, DIG. 29; 140/89; 264/288.4

[56] References Cited

U.S. PATENT DOCUMENTS

| | | | |
|---|---|---|---|
| 2,332,573 | 10/1943 | Hibschman et al. | 72/205 X |
| 3,141,202 | 7/1964 | Linnert et al. | 226/111 X |
| 3,153,696 | 10/1964 | Blanchard | 72/378 X |
| 3,372,320 | 3/1968 | Boyum et al. | 318/7 |
| 3,707,658 | 12/1972 | Hilsenbeck | 318/7 |
| 3,721,809 | 3/1973 | Strandberg, Jr. et al. | 242/57 X |
| 3,870,934 | 3/1975 | Blood | 318/7 |
| 3,974,949 | 8/1976 | Petersen | 226/117 X |
| 4,061,508 | 12/1977 | Moreau | 148/128 |
| 4,066,016 | 1/1978 | Tison | 226/32 X |
| 4,173,133 | 11/1979 | Imai et al. | 72/205 X |
| 4,280,857 | 7/1981 | Dameron, Jr. et al. | 148/128 X |
| 4,321,098 | 3/1982 | Hayden | 148/131 X |

FOREIGN PATENT DOCUMENTS

| | | |
|---|---|---|
| 742106 | 11/1943 | Fed. Rep. of Germany . |
| 10315291 | 1/1964 | Fed. Rep. of Germany . |
| 2258261 | 6/1973 | Fed. Rep. of Germany . |
| 2098752 | 11/1982 | United Kingdom . |

Primary Examiner—Harvey C. Hornsby
Assistant Examiner—Scott J. Haugland
Attorney, Agent, or Firm—Spencer & Frank

[57] ABSTRACT

An apparatus for regulating the length of divisional spacings of a metal band comprises at least two workpiece conveying roller pairs spaced from one another in the direction of the workpiece length and arranged for holding and advancing the workpieces in the direction of workpiece length; a scanning device for determining the actual length of the workpieces during the conveyance thereof by the workpiece conveying devices; an evaluating device receiving, from the scanning device, signals representing the actual lengths of the workpieces; and a length correcting device receiving, from the evaluating device, signals representing correctional values and for varying the length of the workpieces at a location between the roller pairs as a function of the correctional values. A heat treatment device heats the running band to a temperature sufficient to maintain the band in a red-hot state at the length-correcting location.

7 Claims, 1 Drawing Sheet

METHOD AND APPARATUS FOR REGULATING THE LENGTH OF WORKPIECES

This application is a continuation of application Ser. No. 06/515,971, filed July 21, 1983, now abandoned.

This invention relates to a method and an apparatus for regulating the length of workpieces, particularly for regulating the divisional spacings on metallic spring bands provided with alternating cuts along opposite edges. The apparatus comprises a conveying device formed of at least two axially spaced workpiece holders between which the workpieces may be guided as well as a sensor device for determining the actual length of the workpieces (or the actual divisional spacings) and an evaluating unit for determining correctional values between desired and actual lengths of the workpieces.

German Pat. No. 1,031,529 discloses a width measuring apparatus operating without contacting the workpieces. The apparatus—which may be used for steel and metal bands that emit visible light rays—is using two intensity-sensitive photocells which, upon change from light to dark or dark to light at the edges of the band energize, de-energize or reverse setting motors by means of electric control circuits. The desired width of the band should correspond to the distance of the optical axes of the two photocell devices. The apparatus is concerned exclusively with a measuring process with which, by means of similar or dissimilar actuations of the two photocell devices a width deviation of the band may be sensed. A length regulation or correction with such an apparatus is neither feasible nor intended.

Further, German Pat. No. 742,106 discloses an apparatus for measuring the length of running wires, ropes, cables or the like, on which uniformly spaced markings are provided. The workpieces run through two measuring paths of equal length. At the end of the two measuring paths two sensor devices are arranged whose signals are applied to a differential circuit which actuates a warning device in case the two signals differ from one another. If such signalling occurs, the workpiece conveying device is immediately stopped and the malfunctioning manually corrected. Similarly to the earlier-mentioned German Pat. No. 1,031,529, the last-named apparatus essentially relates to a measuring device in which a correction of the length of the individual workpieces does not take place.

SUMMARY OF THE INVENTION

It is an object of the invention to automatically eliminate, immediately after the measuring step, length tolerance fluctuations which appear as a result of the manufacture of the workpieces or in the course of a subsequent treatment such as hardening.

This object and others to become apparent as the specification progresses, are accomplished by the invention, according to which, briefly stated, the lengths or, as the case may be, the divisional spacings of workpieces are corrected in the zone between the two workpiece holders as a function of the previously determined correctional values.

By means of the above-outlined repetitive measuring and length correction sequence there is ensured an optical monitoring of the workpiece quality and a significant reduction of waste. The measuring device may be of any desired type; particularly measuring devices which perform without touching the workpieces are advantageous. For the length monitoring of workpieces moving at high speeds, preferably two optical transmitter/receiver modules (laser light guidewaves) are arranged at a nominal distance from one another which corresponds to the desired workpiece length. These modules scan the workpiece which passes by with constant velocity. The outer edges of the workpieces (light-to-dark or dark-to-light transitions) cause pulse counters to be started or, respectively, to be stopped. From the state of the counter, the counting frequency and the velocity of the workpiece, the deviation from the nominal length may be computed. The switching sequence of the pulse counter determines whether the actual length exceeds or falls below the nominal dimension.

As noted earlier, the length correction may be effected during manufacture or during subsequent treatment of the workpieces immediately after the measuring step or in a timely sequence thereafter. Such corrections are in the millimeter range or below, but if they are not performed, they may have a significant effect on the behavior of the workpieces during their service. In particular, spacer springs for steel band piston rings made of spring steel are affected because the length tolerance fluctuations during stamping, bending and hardening lead to excessive band length deviations which, in service, result in excessive tangential force fluctuations causing a non-uniform pressing of the piston rings against the cylinder wall.

By means of the automatic correction of divisional spacings according to the invention, it is ensured that the length tolerance fluctuations appearing during the above-noted manufacturing steps are compensated for.

Similarly to the measuring device, the workpiece holder too, may be of desired design (as required by the particular workpiece). In case of elongated workpieces, particularly spring bands having alternating cuts along opposite longitudinal edges, at least one, but preferably both workpiece holders are roller pairs whose rollers hold the workpiece between themselves with a predetermined pressing force.

According to a feature of the invention, spacings on the workpieces are alterable by providing that the distance between the two roller pairs is adjustable as a function of the determined deviation from the nominal value and, accordingly, the workpiece, by reducing the distance between the roller pairs, is compressed (upset) and conversely, by increasing the distance between the roller pairs, the workpiece is stretched. The roller pairs may be mounted on brackets, of which at least one is displaceable in the direction of length alteration.

According to a further feature of the invention, at least one roller of each roller pair is controlled by means of a stepping motor or servomotor. The rpm of preferably at least one of the stepping motors is variable. The length adjustment of the workpieces is achieved by means of an appropriate rpm difference between the stepping motors of the two roller pairs, as a function of the length to be corrected. In principle, it is sufficient to stretch to a greater or lesser degree the workpiece only in the zone of one stepping motor. Preferably, such a stretching should take place in the zone of the stepping motor which drives the first (or upstream) roller pair as viewed in the direction of advance of the workpiece. As noted before, by means of an evaluating unit the correctional values for the length variation are determined and are used for controlling the roller pair or roller pairs or, as the case may be, the stepping motor or stepping motors.

A method according to the invention for regulating the divisional spacings on metal spring bands during a hardening treatment thereof, wherein the measurement and evaluation is effected as described before, is characterized in that the length alteration is carried out while the workpiece is in a red-hot condition. This method may find application in particular in case of continuous induction-type hardening treatment. Preferably, the divisional spacings are measured downstream of the induction coil (which brings the band to a red-hot condition), but upstream of the workpiece quenching station. The regulation of the divisional spacings is performed upstream of the sensor device as viewed in the direction of workpiece advance.

DESCRIPTION OF THE PREFERRED EMBODIMENTS

Figure 1:
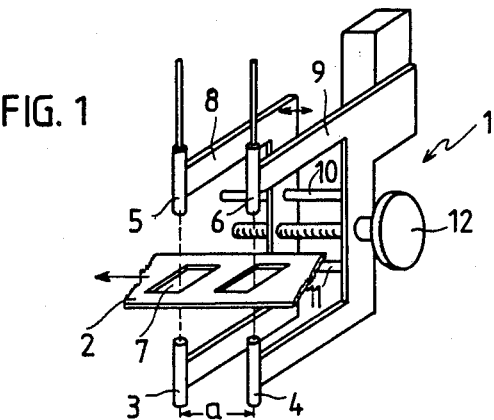
FIG. 1 is a schematic perspective view of an example of a measuring device forming part of the apparatus incorporating the invention.

Turning now to FIG. 1, there is shown a measuring device generally designated at 1 for measuring lengths on a run-through workpiece 2. The measuring device comprises two optical transmitters 3 and 4 spaced from one another parallel to the direction of workpiece feed at a distance a (distance between the axes of the optical transmitters 3,4) which corresponds to the nominal length, as well as receivers 5 and 6 associated with the optical transmitters 3 and 4, respectively. The optical devices 3,5 and 4,6 sense the workpiece 2 which moves with a constant speed v and which is, for example, a metal strip having a plurality of serially-arranged windows 7 having identical distances between edges extending perpendicularly to the direction of workpiece feed. The optical transmitters 3 and 4 and the receivers 5 and 6 are arranged below and above the workpiece 2 in a precise alignment. The optical transmitter 3 and the cooperating receiver 5 on the one hand, and the optical transmitter 4 and the cooperating receiver 6, on the other hand, are mounted on U-shaped brackets 8 and 9, respectively, which are coupled with one another by means of guide rods 10 and 11. The distance between the U-shaped frames 8 and 9 may be varied by a screw 12 connecting the two frames for the purpose of altering the nominal length a.

Figure 2:
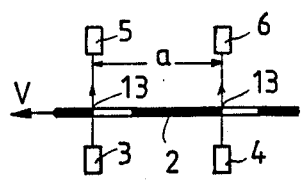
FIGS. 2, 3 and 4 are schematic side elevational views illustrating the principle of measurement performed by the device shown in FIG. 1.
Figures 3, 4:
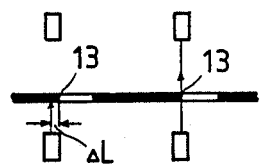

Turning now to FIGS. 2, 3 and 4, there is schematically illustrated the measuring principle utilized according to the invention. From the outer edges 13 of the workpieces (transition from light to dark or from dark to light) pulse counters are started and then stopped. From the state of the counters, the counting frequency and the workpiece velocity, the deviation from the nominal dimension may be computed. The switching sequence determines whether an excess or a shortfall relative to the nominal value has occurred.

Turning in particular to FIG. 2, the receivers 5 and 6 switch simultaneously which thus signifies that there is no deviation from the nominal value. In FIG. 3, the receiver 5 switches prior to the receiver 6. This means that the actual dimension is by $\Delta L$ shorter than the nominal dimension and consequently the workpiece 2 should be stretched to a greater extent in order to effect a correction. In FIG. 4 the receiver 6 switches prior to the receiver 5; thus, the actual length is by $\Delta L$ longer than the nominal value so that the workpiece 2 should be stretched to a lesser extent in order to effect a correction.

Figure 5:
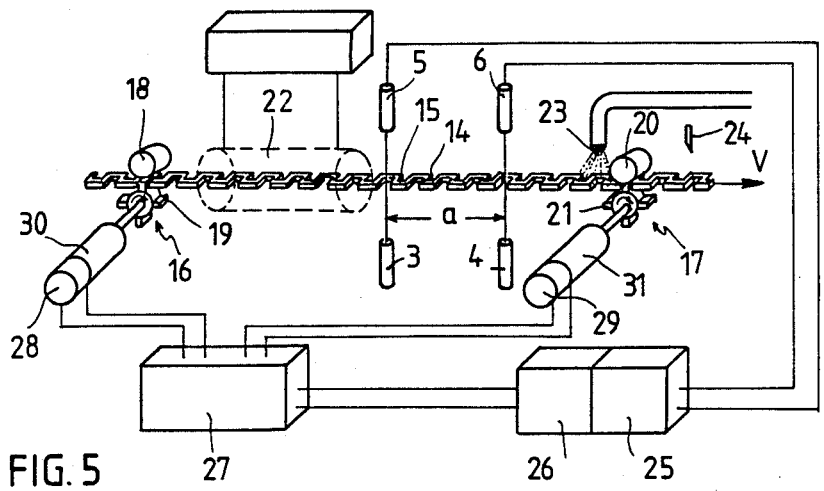
FIG. 5 is a schematic perspective view, with block diagram, of a preferred embodiment of the invention.

Turning now to FIG. 5, there is schematically illustrated an apparatus for measuring and, at the same time, regulating (correcting) the divisional spacings a (nominal dimensions) of a spring band 15 (provided with alternating cuts 14) during a continuous inductive hardening thereof. The apparatus essentially comprises two workpiece holders formed of two roller pairs generally designated at 16 and 17. The rollers 18 and 19 of the roller pair 16 and the rollers 20 and 21 of the roller pair 17 receive the workpiece 15 with a predetermined pressure. The workpiece 15, viewed in the direction of advance, is guided, immediately downstream of the first roller pair 16, through an inductive hardening apparatus (induction coil) 22 and brought to a red-hot condition. As soon as the red-hot workpiece 15 has left the zone of the induction coil 22, it is measured in a manner described in connection with FIGS. 1-4, wherein the edges of the cuts 14 serve as measuring points. Thereafter, the workpiece 15 is quenched with water by means of a spraying station 23 and subsequently the workpiece 15 passes between the roller pair 17.

The correction of the divisional spacings (cutting lengths) of the workpiece 15 intermittently severed by cutter 24 downstream of the second roller pair 17 is effected in a manner described below.

The spring band (workpiece) 15 is scanned in a contactless manner by means of the optical transmitters 3, 4 and receivers 5, 6 arranged at the nominal distance a from one another. Stated differently, the dark-light transitions of the workpiece 15 are sensed. Two pulse counters 25 and 26 are, according to the switching sequence, started and stopped, respectively. The result derived from the counters, multiplied by the workpiece velocity factor, yields the actual deviations from the nominal value a as explained in connection with FIGS. 2, 3 and 4. An evaluating device 27 determines the correctional values relative to the nominal dimension and controls two stepping motors 30 and 31 by means of incremental signal transmitters 28 and 29. Preferably, the stepping motor 31 runs with a constant rpm whereas the stepping motor 30 may be rpm-variable. According to the determined values, the spring band 15 is stretched to a lesser or greater extent by means of the stepping motor 30 which is controlled by the evaluating device 27 and whose rpm is to a greater or lesser extent smaller than that of the stepping motor 31 as a function of the measured length. In this manner, a divisional length correction between the two rollers pairs 16 and 17 is effected on the red-hot workpiece 15.

It will be understood that the above description of the present invention is susceptible to various modifications, changes and adaptations, and the same are intended to be comprehended within the meaning and range of equivalents of the appended claims.

What is claimed is:

1. An apparatus for regulating divisional spacings of a metal spring band of indefinite length provided with alternating cuts on opposite longitudinal edges, comprising (a) conveying means for advancing said band parallel to the length thereof; said conveying means including two roller pairs spaced from one another in a band conveying direction and each formed of cooperating rollers for engaging the band passing therethrough;

(b) heat treating means for heating the band to a temperature sufficient to maintain said band in a red-hot state between said two roller pairs;

(c) quenching means situated downstream of said heat treating means as viewed in a direction of advance of said band for cooling said band;

(d) scanning means sitauted between said two roller pairs upstream of said quenching means for determining actual lengths of said divisional spacings;

(e) evaluating means operatively connected to said scanning means for generating a regulating signal derived from a difference between the actual lengths and desired lengths of said divisional spacings; and (f) regulating means operatively connected to said evaluating means for correcting the length of said divisional spacings between said two roller pairs as a function of said regulating signal.

2. An apparatus as defined in claim 1, further comprising separate stepping motors for driving at least one roller of each said roller pair.

3. An apparatus as defined in claim 2, wherein said force-exerting means includes means for varying the rpm of at least one of said stepping motors for varying the tension on the workpiece between the upstream and downstream roller pairs.

4. An apparatus as defined in claim 3, wherein the rpm of the stepping motor driving a roller of said upstream roller pair is variable.

5. A method of regulating divisional spacings of a running metal spring band of indefinite length during a hardening treatment thereof; subsequent steps of heating said band to a red-hot state and quenching said band; said band having alternating cuts on opposite longitudinal edges, comprising the following steps:

(a) feeding said band parallel to the length thereof by passing said band between two conveying roller pairs spaced from one another in a travelling direction of said band;

(b) heating the running band to a red-hot state at a first location; the heating step forming part of said hardening treatment;

(c) quenching said band at a second location situated downstream of said first location as viewed in a running direction of the band; the quenching step forming part of said hardening treatment;

(d) scanning said cuts simultaneously at consecutive third and fourth longitudinally spaced locations being at a desired divisional spacing from one another and being situated between said two conveying roller pairs upstream of said second location;

(e) generating first signals in response to each cut passing through said third location and second signals in response to each cut passing through said fourth location;

(f) forming a third signal by comparison of said first and second signals; said third signal representing a deviation between the desired divisional spacing and the actual distance between cuts; and (g) regulating, between said roller pairs, the actual distance as a function of said third signal during a red-hot state of said band.

6. A method as defined in claim 5, wherein said scanning step is performed downstream of heating said band to a red-hot state.

7. An apparatus as defined in claim 1, wherein said heating means is situated between said two roller pairs.

* * * * *